(12) United States Patent
Cheng

(10) Patent No.: US 11,788,039 B1
(45) Date of Patent: Oct. 17, 2023

(54) WINE FILTERING SYSTEM

(71) Applicant: Peter Shu-Chun Cheng, Hong Kong (CN)

(72) Inventor: Peter Shu-Chun Cheng, Hong Kong (CN)

( * ) Notice: Subject to any disclaimer, the term of this patent is extended or adjusted under 35 U.S.C. 154(b) by 12 days.

(21) Appl. No.: 17/886,550

(22) Filed: Aug. 12, 2022

(51) Int. Cl.
*C12H 1/07* (2006.01)

(52) U.S. Cl.
CPC ................... *C12H 1/063* (2013.01)

(58) Field of Classification Search
CPC ...................................................... C12H 1/063
USPC ........................................................ 99/277.1
See application file for complete search history.

(56) References Cited

U.S. PATENT DOCUMENTS

| 287,272 | A | * | 10/1883 | Glass | ...................... | A23L 2/80 |
| | | | | | | 261/78.2 |
| 2010/0122919 | A1 | * | 5/2010 | Burroughs | ......... | A47G 19/2205 |
| | | | | | | 206/217 |

FOREIGN PATENT DOCUMENTS

| CN | 210474383 | * | 5/2020 |
| CN | 210474383 | U | 5/2020 |

OTHER PUBLICATIONS (https://advancedmixology.com/blogs/art-of-mixology/best-wine-funnels) <https://advancedmixology.com/blogs/art-of-mixology/best-wine-funnels>, website of catalogue that illustrates various wine decanters using strainers, website accessed Aug. 11, 2022, screen shots attached for website (16 pages).

* cited by examiner

*Primary Examiner* — Dana Ross
*Assistant Examiner* — Joseph W Iskra
(74) *Attorney, Agent, or Firm* — Robert P. Michal, Esq.; Carter, DeLuca & Farrell LLP

(57) ABSTRACT

A wine filtering system includes a container assembly, a collector, and a screen assembly. The collector is configured to be supported by the container assembly. The screen assembly is configured to be supported by the collector and within the container assembly. The screen assembly includes a screen mount having one or more mesh screens secured thereto. The one or more mesh screens are configured to separate at least portions of an alcohol component of wine from a juice component of wine sprayed thereagainst to define a filtered wine and a filtered alcohol. The one or more mesh screens enable the filtered wine to pass through the one or more mesh screens for collection by the collector such that the collector directs the collected filtered wine into the container assembly.

20 Claims, 10 Drawing Sheets

WINE FILTERING SYSTEM

TECHNICAL FIELD

This disclosure is directed wine filtering systems, and more particularly, to systems for reducing wine toxicity.

BACKGROUND

Wine is an alcoholic beverage made from fermented grape juice. To reduce the toxicity of wine before bottling, wineries often treat copious quantities of the wine with chemicals and/or exposure to high temperatures. Unfortunately, such treatment often causes the wine to lose taste and character. To account for this loss of taste and character, taster elements are then added.

SUMMARY

To help improve wine filtering and the need for the complexities associated with chemical and/or high temperature treatments that still require the addition of taster elements, this disclosure details an innovative wine filtering system. Indeed, the wine filtering system of this disclosure functions to filter wine without loss of taste while simultaneously establishing an intensified aromatic atmosphere beyond any de minimis scent release associated with bottle opening and/or pouring.

One aspect of the disclosure is directed to a wine filtering system including an atomizer and a filter assembly. The atomizer configured to support a storage vessel that stores wine having a juice component and an alcohol component. The atomizer includes a spray nozzle operably coupled to the actuator. The actuator is actuatable to dispense the wine from the storage vessel and through the spray nozzle as a spray. The filter assembly includes a collector and a screen assembly supported by the collector. The screen assembly includes a screen mount supported by the inner surface of the collector and secured to at least one mesh screen. The at least one mesh screen is spaced from the inner surface of the collector. The at least one mesh screen is configured to separate at least portions of the alcohol component of the spray from the juice component of the spray to define a filtered wine and a filtered alcohol when the spray collides with the at least one mesh screen. The at least one mesh screen enables the filtered wine to pass through the at least one mesh screen for collection by the inner surface of the collector. The collector is configured to enable the collected filtered wine to pass therethrough and out of the filter assembly.

In aspects, the wine filtering system may further include a container configured to removably support the filter assembly. The container may define a storage cavity that is disposed in fluid communication with the collector when the filter assembly is disposed in the container. The container is configured to receive and store the filtered wine passed through the filter assembly.

In aspects, the at least one mesh screen may include a metallic material.

In aspects, the at least one mesh screen may define a plurality of apertures therethrough.

In aspects, the collector may include a natural material, a synthetic material, or combinations thereof. The collector may include polymeric material.

In aspects, the container may include a spout to enable the filtered wine to be poured from the container into a drinking glass.

In aspects, the plurality of apertures of the at least one mesh screen may be configured to cause air molecules within the spray to reflect off the at least one mesh screen and release an aroma into the atmosphere when the spray collides with the at least one mesh screen.

In aspects, the at least one mesh screen may include at least 4 apertures per square millimeter.

According to another aspect, this disclosure is directed to a method for filtering wine, the method includes spraying stored wine through at least one mesh screen to separate at least some of an alcohol component of the stored wine from a juice component of the stored wine so that the stored wine is divided into a first portion and a second portion. The first portion is filtered wine that passes through the at least one mesh screen. The method further includes collecting the filtered wine on an inner surface of a collector coupled to the at least one mesh screen and disposed in spaced relation to the at least one mesh screen, and dispensing the collected filtered wine through an open-end portion of the collector.

In aspects, the method may include reflecting air molecules within the stored wine off of the at least one mesh screen to release an aroma into the atmosphere.

In aspects, the method may involve dispensing the filtered wine directly into a drinking glass.

In aspects, the method may include dispensing the filtered wine into a container configured to removably support the collector and the at least one mesh screen therein.

In aspects, the method may involve pouring the filtered wine out of a spout of the container into a drinking glass.

According to one aspect, this disclosure is directed to a wine filtering system. The wine filtering system includes a container assembly, a collector, and a screen assembly. The collector is configured to be supported by the container assembly. The screen assembly is configured to be supported by the collector and within the container assembly. The screen assembly includes a screen mount having at least one mesh screen secured thereto. The at least one mesh screen is configured to separate at least portions of an alcohol component of wine from a juice component of wine sprayed thereagainst to define a filtered wine and a filtered alcohol. The at least one mesh screen enables the filtered wine to pass through the at least one mesh screen for collection by the collector such that the collector directs the collected filtered wine into the container assembly.

In aspects, the wine filtering system may further include an atomizer that is configured to spray the wine against the at least one mesh screen. The atomizer may be selectively attachable to an opened wine bottle.

In aspects, the container assembly may include a first elongated tray and a second elongated tray that is receivable within the first elongated tray. The first and second elongated trays may define a collector receiving channel therebetween. The collector may be receivable within the collector receiving channel to support the collector in an upright position relative to the first and second trays so that the screen assembly can be supported within the second elongated tray and positioned against the collector at an angle. The at least one mesh screen may include two mesh screens that are secured to the screen mount via stitching.

Other features of the disclosure will be appreciated from the following description.

BRIEF DESCRIPTION OF THE DRAWINGS

Various aspects of the disclosed wine filtering system are described herein below with reference to the drawings, wherein.

DETAILED DESCRIPTION

Figure 1:
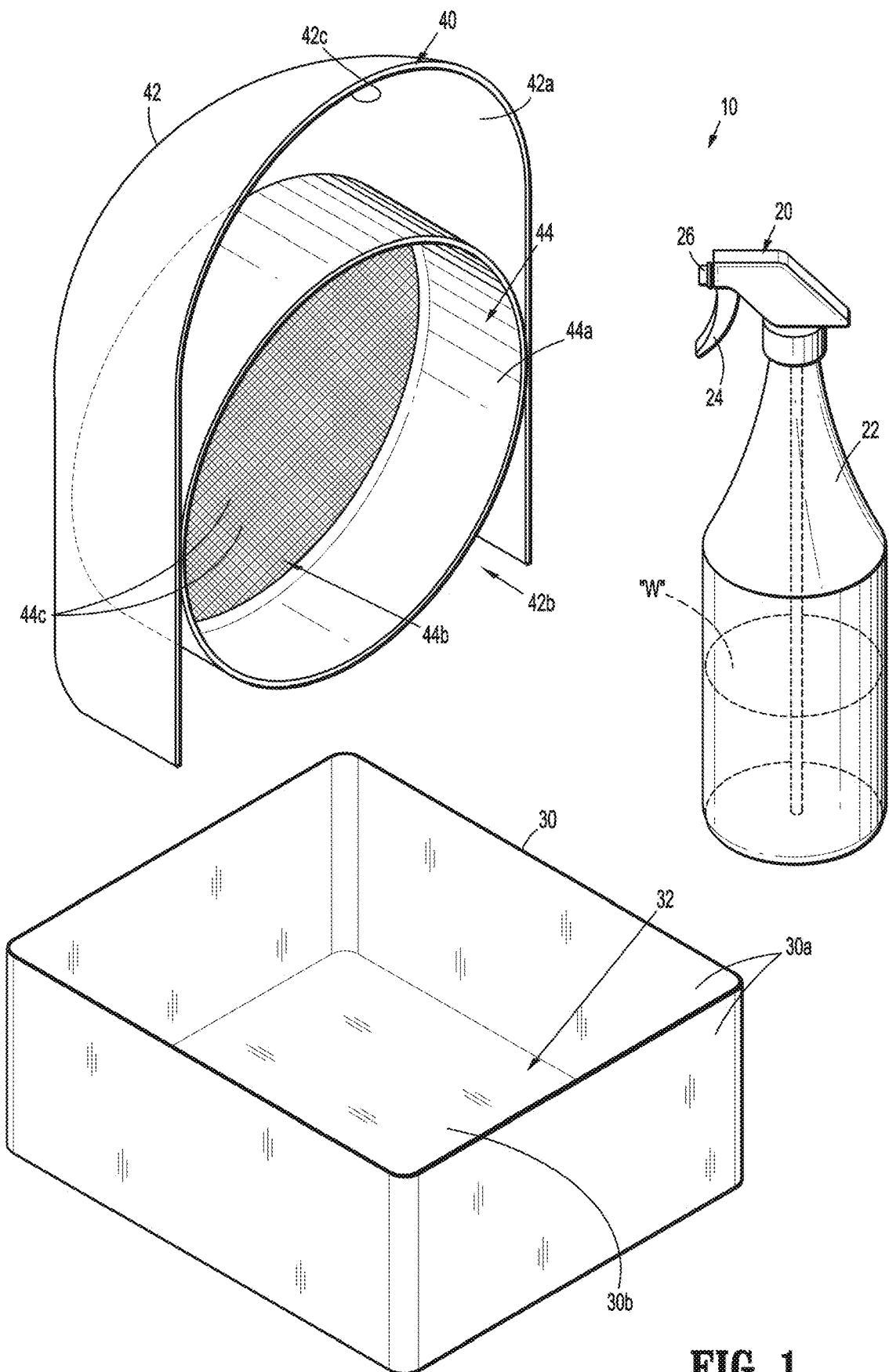
FIG. 1 is a perspective view of a wine filtering system in accordance with aspects of this disclosure.

The disclosed wine filtering system will now be described in detail with reference to the drawings in which like reference numerals designate identical or corresponding elements in each of the several views. However, it is to be understood that aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in any appropriately detailed structure. In addition, directional terms such as upper, lower, top, bottom, side and similar terms are used to assist in understanding the description and are not intended to limit the disclosure.

Figure 2:
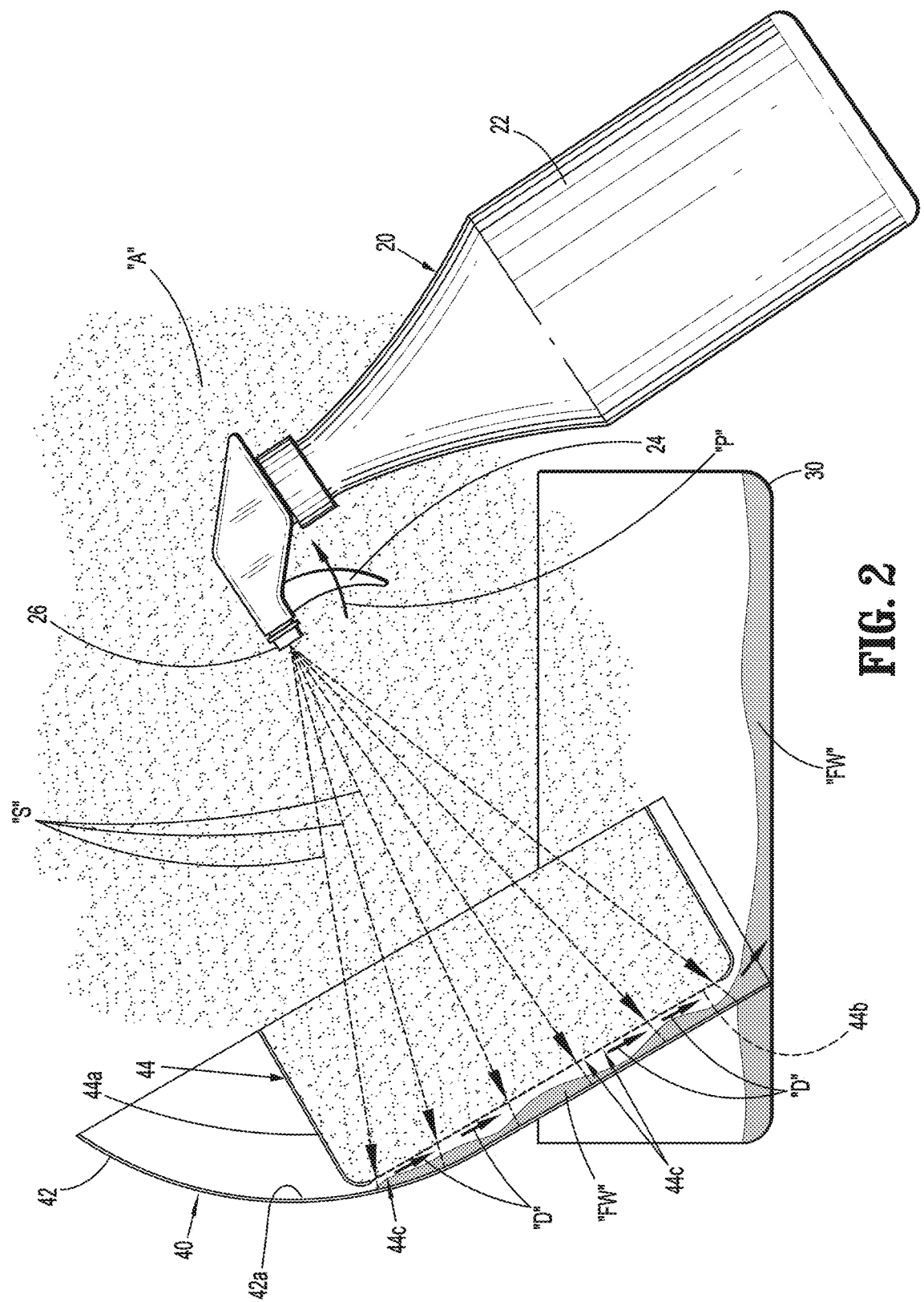
FIG. 2 is a side view illustrating a process for filtering wine with an atomizer, a filter assembly, and a container of the wine filtering system of FIG. 1, the filter assembly and container shown in cross-section for clarity.
Figure 4:
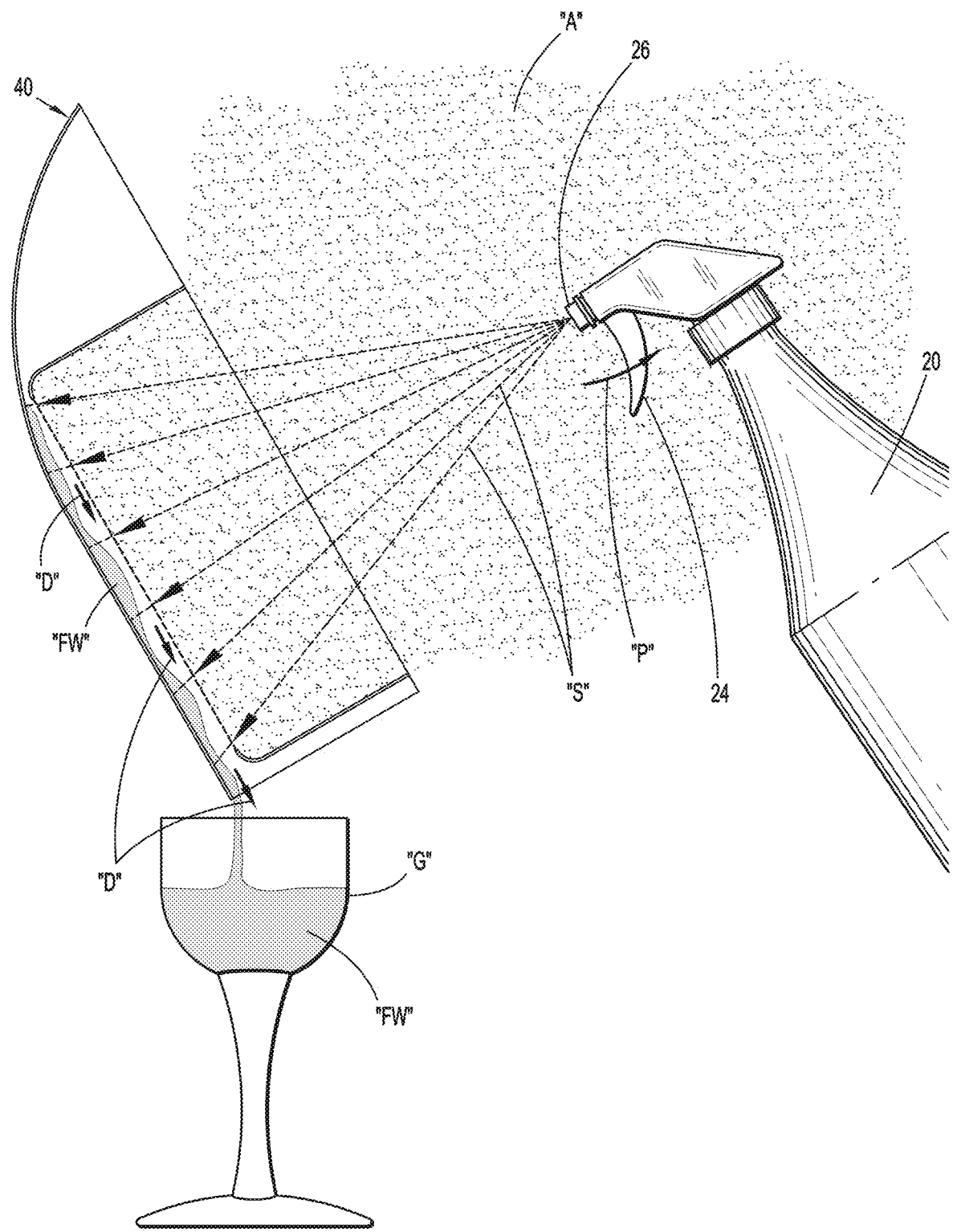
FIG. 4 is a side view illustrating the atomizer and the filter assembly of the wine filtering system of FIG. 1 filtering wine and dispensing the filtered wine into a glass in accordance with the principles of this disclosure, the filter assembly shown in cross-section for clarity.

With reference to FIGS. 1, 2 and 4, a wine filtering system 10 includes an atomizer 20, a container 30, and a filter assembly 40.

The atomizer 20 of wine filtering system 10 includes a storage vessel 22 configured to store wine "W" having a juice component and an alcohol component. The atomizer 20 further includes an actuator 24 operably coupled to the storage vessel 22 and a spray nozzle 26 operably coupled to the storage vessel 22. The actuator 24 is actuatable, as indicated by arrows "P," to dispense the wine "W" from the storage vessel 22 and through the spray nozzle 26 as a spray "S" that travels at a rate of 10 inches per second, for instance, although other faster and slower rates are suitable.

The filter assembly 40 of wine filtering system 10 includes a collector 42 and a screen assembly 44.

The collector 42 of the filter assembly 40 has an inner surface 42a that defines a closed end portion 42c on an upper or top end portion of collector 42 and an open-end portion 42b on a lower or bottom end portion of collector 42. The collector 42 may be formed or include any suitable natural or synthetic material. In some aspects, the collector 42 may be a polymeric material such as plastic.

The screen assembly 44 of the filter assembly 40 includes a screen mount 44a that is supported by the inner surface of the collector 42, and is some aspects, may be selectively attached to collector 42 by, for example, a fastening device, such as tape, hook and loop, fasteners, magnetics, stitching, etc. or any other suitable fastening technique. Screen mount 44a includes one or more mesh screens 44b secured thereto. Although screen mount 44a and the at least one mesh screen 44b are shown as having a circular configuration, any suitable shape or configuration may be provided. Each mesh screen 44b is spaced from the inner surface 42a of the collector 42 and is disposed in fluid communication with the open-end portion 42b of the collector 42. Each mesh screen 44b is configured to separate at least portions of the alcohol component of the spray "S" from the juice component of the spray "S" to define a filtered wine "FW" and a filtered alcohol when the spray "S" collides with the mesh screen 44b. Each mesh screen 44b defines a plurality of apertures 44c therethrough that enable the filtered wine "FW" to pass through the mesh screen 44b for collection by the inner surface 42a of the collector 42. Each mesh screen 44b is configured, and the plurality of apertures 44c positioned, to cause air molecules within the spray to reflect off the mesh screen 44b and release an aroma "A" into the atmosphere when the spray "S" collides with the mesh screen 44b. In aspects, each mesh screen 44b may include at least 4 apertures per square millimeter.

In aspects, each mesh screen 44b may include a metallic material, although any suitable material such as natural or artificial materials (e.g., wood, metal, plastic, glass, ceramic, textile, fiber, etc.). The open-end portion 42b of the collector 42 is configured to enable the collected filtered wine "FW" to pass therethrough and out of the filter assembly 40, as indicated by arrows "D."

The container 30 of wine filtering system 10 is configured to removably support or seat the filter assembly 40 therein, for example, at an angle as shown in FIG. 2 to facilitate positioning of each mesh screen 44b relative to the atomizer 20 for achieving optimal spraying angle. The container 30 defines a storage cavity 32 that is defined by walls 30a and a base 30b of the container 30. Although shown having a square configuration, container 30 may have any suitable shape and/or configuration such as an elongated configuration, a rectangular configuration, pentagonal configuration, hexagonal configuration, octagonal configuration, a circular configuration, a non-circular configuration, or any other suitable geometric shape. In aspects, container 30 may include a surface feature such as a hook, a notch, a nub, or a rib extending along one or more of the walls 30a, the base 30b, or combinations thereof to secure filter assembly 40 in position relative to container (e.g., for preventing filter assembly 40 from sliding along container 30) Container 30 may be formed or include any suitable natural or synthetic material. In some aspects, the container may be a polymeric material such as plastic. Container 30 is configured to receive filter assembly 40 therein such that storage cavity 32 is disposed in fluid communication with the open-end portion 42b of the collector 42b (e.g., on an open-end portion of filter assembly 40) when the filter assembly 40 is disposed in the container 30. The container 30 is configured to receive and store the filtered wine "FW" passed through the filter assembly 40.

Figure 3:
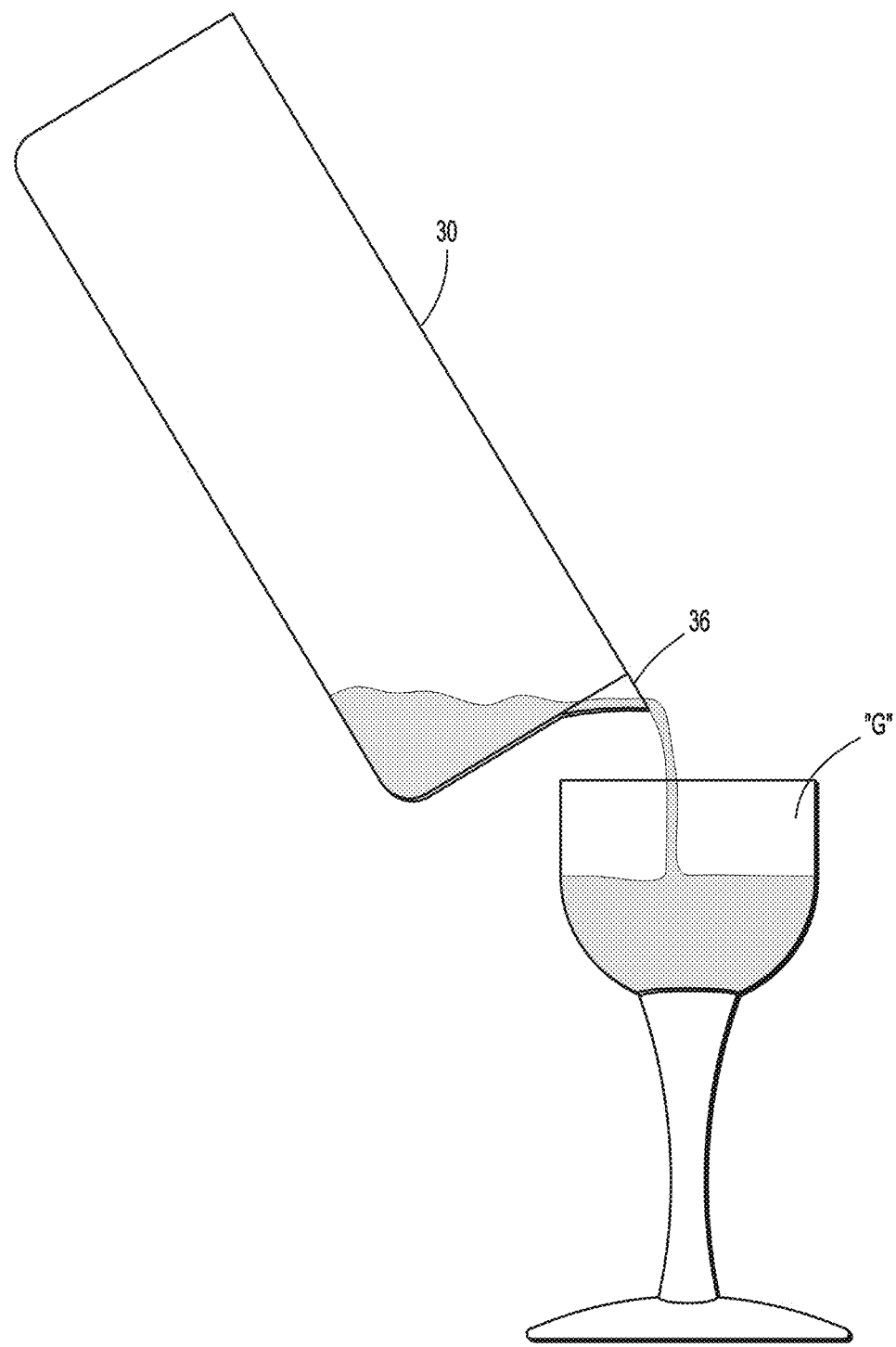
FIG. 3 is a side view illustrating wine filtered with the wine filtering system of FIG. 1 being dispensed from another container of the wine filtering system of FIG. 1 into a glass in accordance with the principles of this disclosure.

As seen in FIG. 3, the container 30 may include a spout 36 to enable the filtered wine "FW" to be poured from the container 30 directly into a drinking glass "G."

A method of filtering stored wine includes spraying the stored wine "SW" through one or more mesh screens 44b to separate at least some alcohol component of the stored wine "SW" from the juice component of the stored wine "SW" so that the stored wine "SW" is divided into a first portion and a second portion. The first portion is filtered wine "FW" that passes through each mesh screen 44b. The filtered wine "FW" is then collected on the inner surface 42a of collector 42 so that the filtered wine "FW" can be dispensed through an open-end portion 42b of the collector 42. Each mesh screen 44b reflects air molecules within the stored wine "SW" off of the mesh screen 44b when sprayed to release the aroma "A," a robust wine fragrance, into the atmosphere.

Figure 5A:
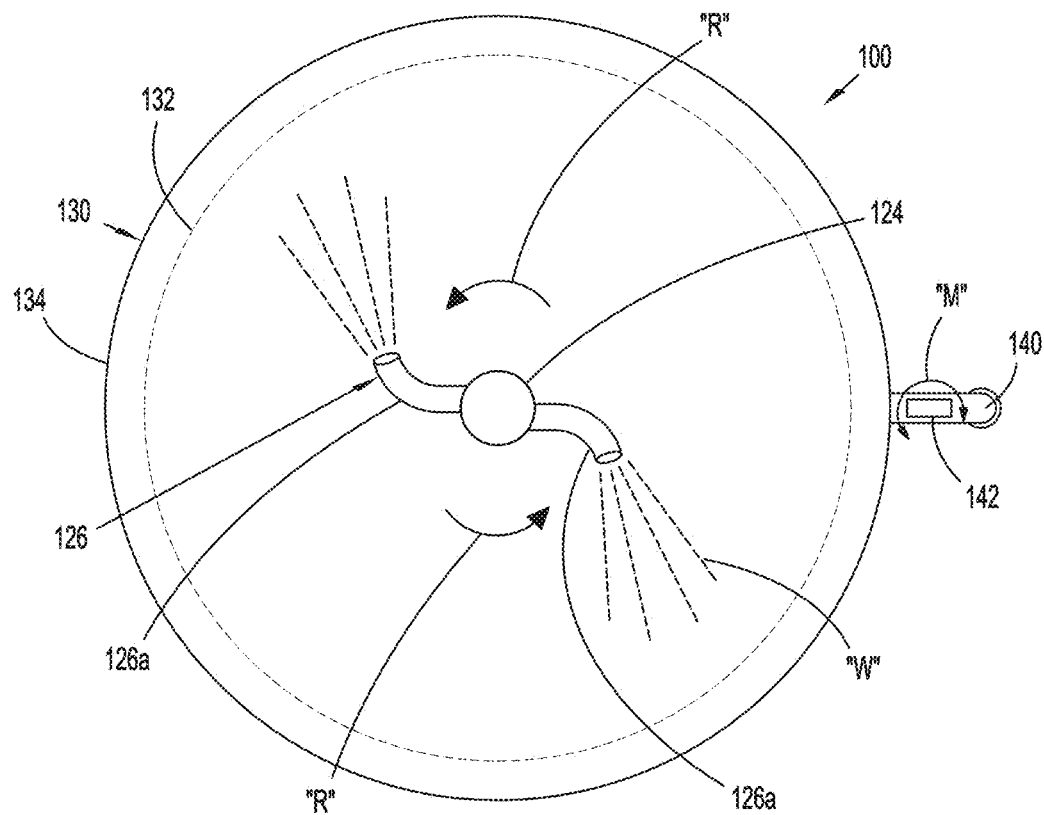
FIGS. 5A and 5B are views illustrating another wine filtering system in accordance with aspects of this disclosure.
Figure 5B:
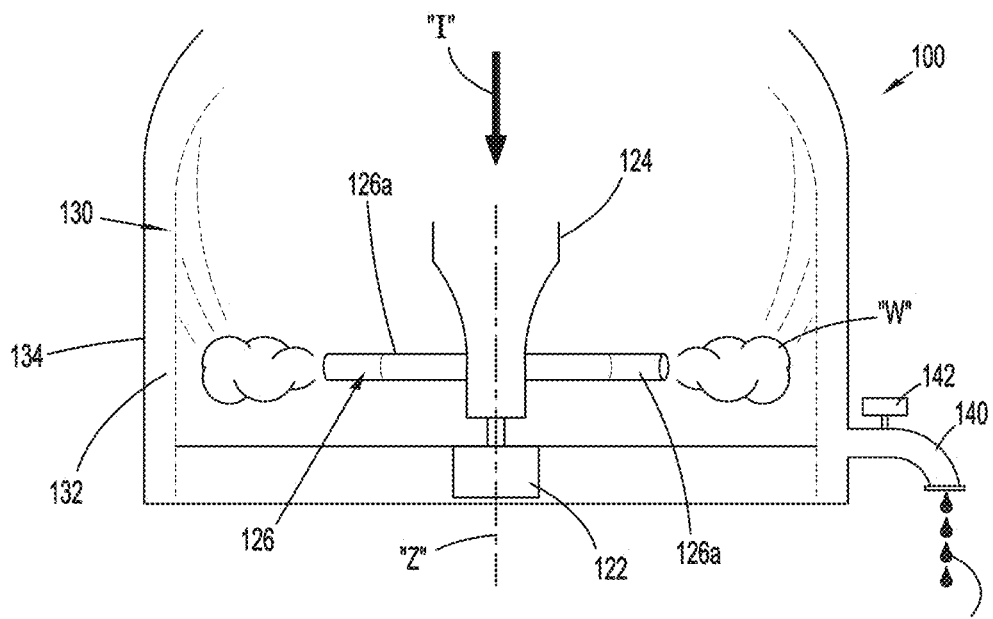

With reference to FIGS. 5A and 5B, another wine filtering system 100 is similar to wine filtering system 10, but includes an atomizer 120, a filter assembly 130, and a spigot 140. In wine filtering system 100, atomizer 120 includes a motor 122, an inlet assembly 124 rotatably coupled to the motor 122, and an outlet assembly 126 coupled to inlet assembly 124. Inlet assembly 124 is configured to receive wine "W" therein as indicated by arrow "I." Although only two conduits 126a are shown, outlet assembly 126 may include any number of conduits 126a configured to dispense wine "W" therefrom. Motor 122 is actuatable to rotate inlet and outlet assemblies 124, 126 about a central axis "Z" defined through motor 122, as indicated by arrows "R," to dispense or spray wine "W" radially outward from outlet assemblies 124, 126 via centrifugal force. The dispensed wine "W" is filtered through filter assembly 130 via one or more mesh screens 132 and a collector 134 similar to that described above with respect to filter assembly 40 of wine filtering system 10. Collector 134 then directs filtered wine "FW" toward spigot 140 to enable spigot 140 to dispense filtered wine "FW" therefrom. Spigot 140 may include a valve 142. Valve 142 is configured to be actuated (e.g., rotated), as indicated by arrows "M" for selectively controlling a flow of the filtered wine "FW" from spigot 140.

Turning now to FIGS. 6-11, still another wine filtering system 200 is similar to wine filtering system 10 and includes an atomizer 220, a container assembly 230, and a filter assembly 240.

Figure 10:
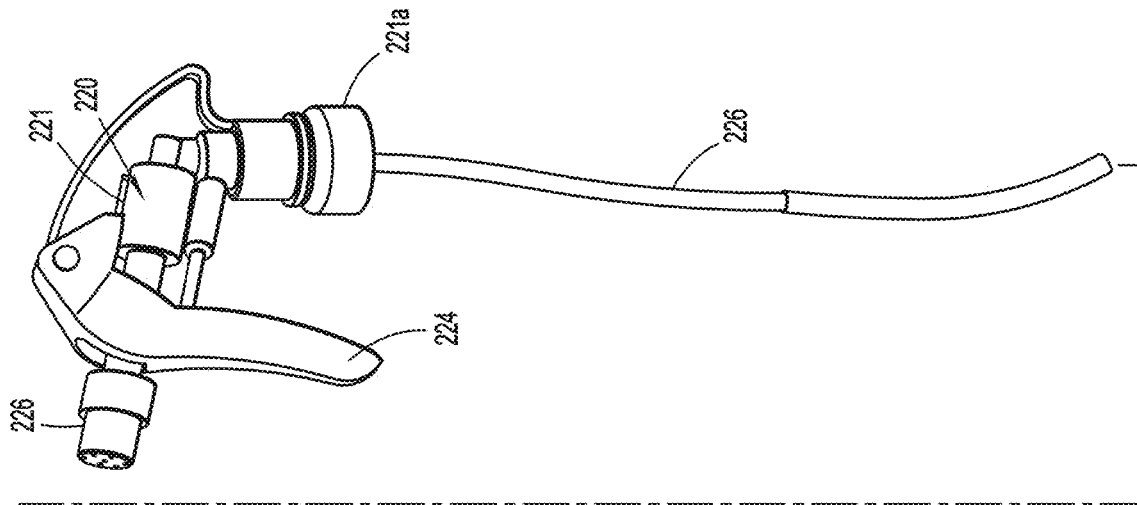
FIGS. 9-11 are progressive views illustrating an atomizer of the wine filtering system of FIG. 6 being secured to an opened wine bottle in accordance with aspects of this disclosure.
Figure 9:
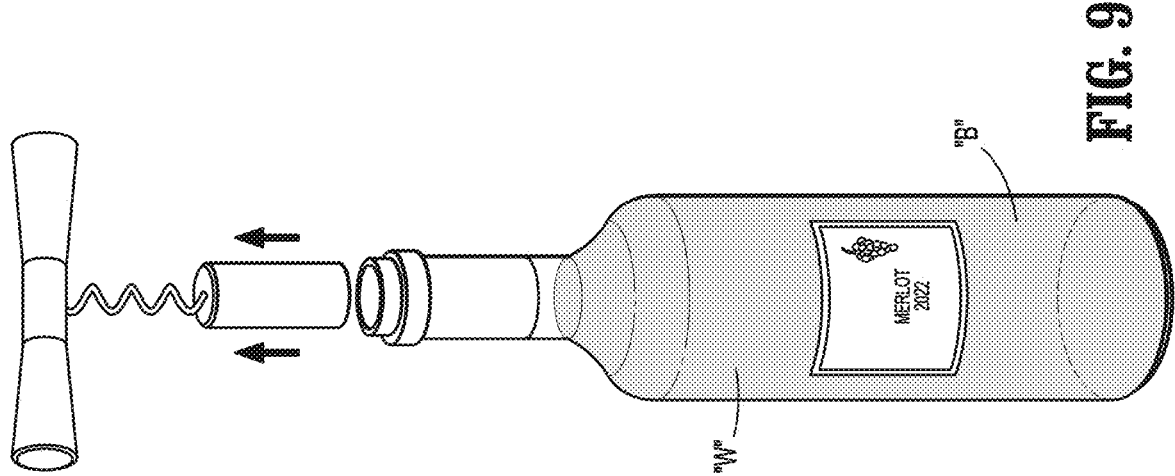
Figure 11:
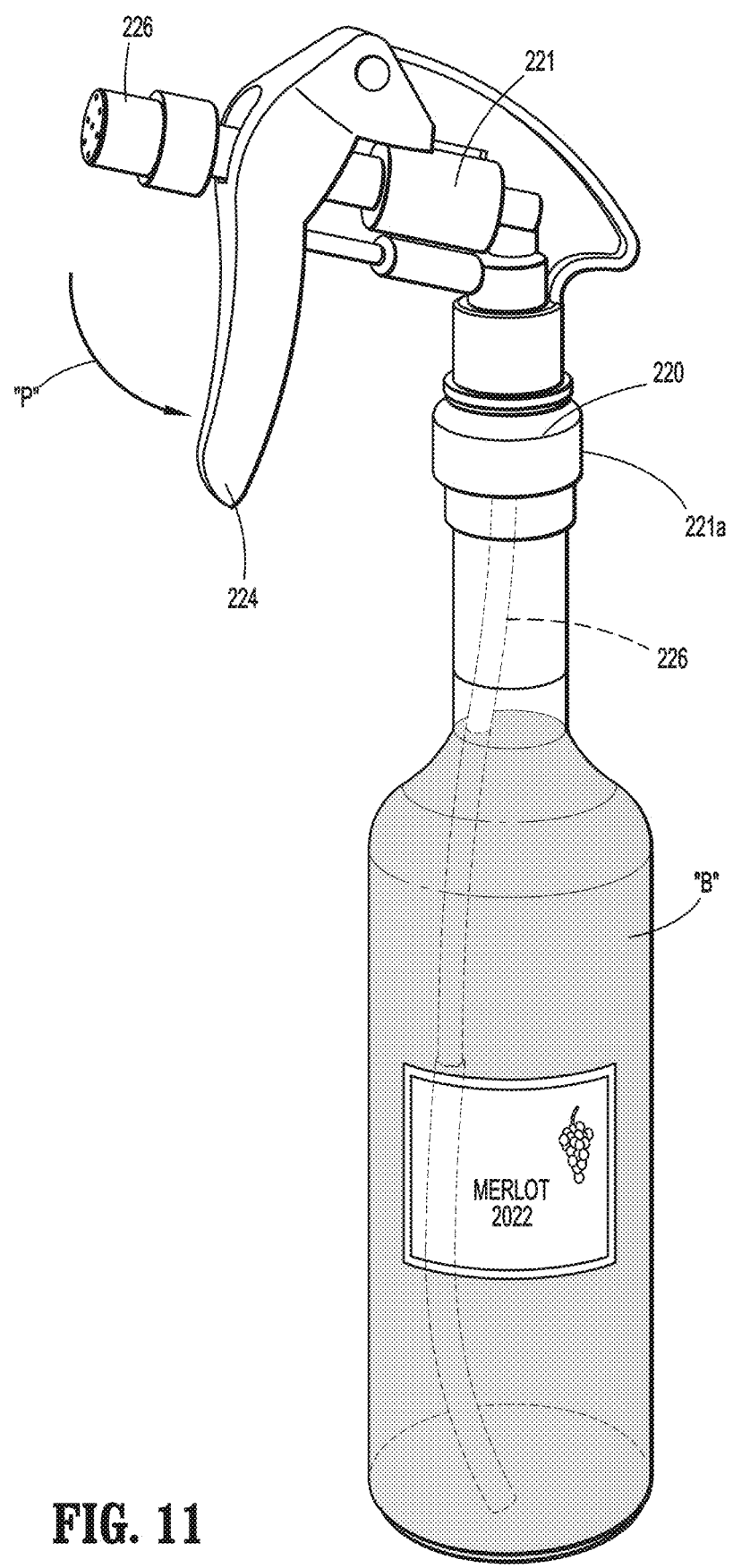

Atomizer 220 of wine filtering system 200 includes a housing 221 coupled to an inlet tube 222, an actuator 224, and a spray nozzle 226. Housing 221 includes an attachment coupling 221 configured to selectively attach atomizer 220 to an opened wine bottle "B" as seen in FIGS. 10 and 11. The actuator 224 is actuatable, as indicated by arrows "P," to dispense the wine "W" from the opened wine bottle "B" and through the spray nozzle 226.

Container assembly 230 includes a first elongated tray 232 and a second elongated tray 234. Second elongated tray 234 is configured to receive first elongated tray 232 therein and such that first and second elongated trays 232, 234 are configured to support filter assembly 240 therein. First and second elongated trays 232, 234 define a collector receiving channel 236 therebetween when first elongated tray 232 is supported within second elongated tray 234.

Figure 6:
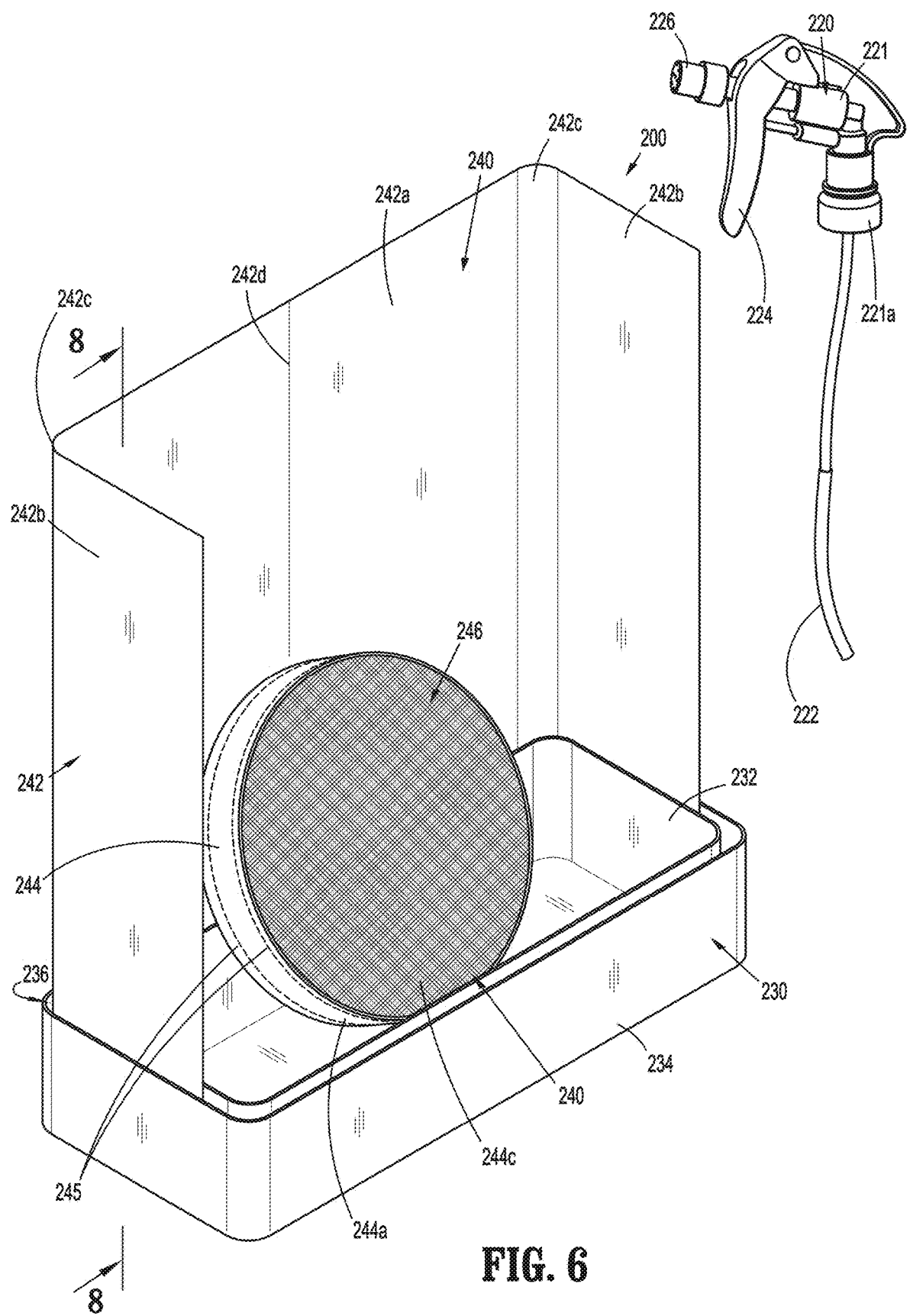
FIG. 6 is a perspective view of still another wine filtering system in accordance with aspects of this disclosure.
Figure 7:
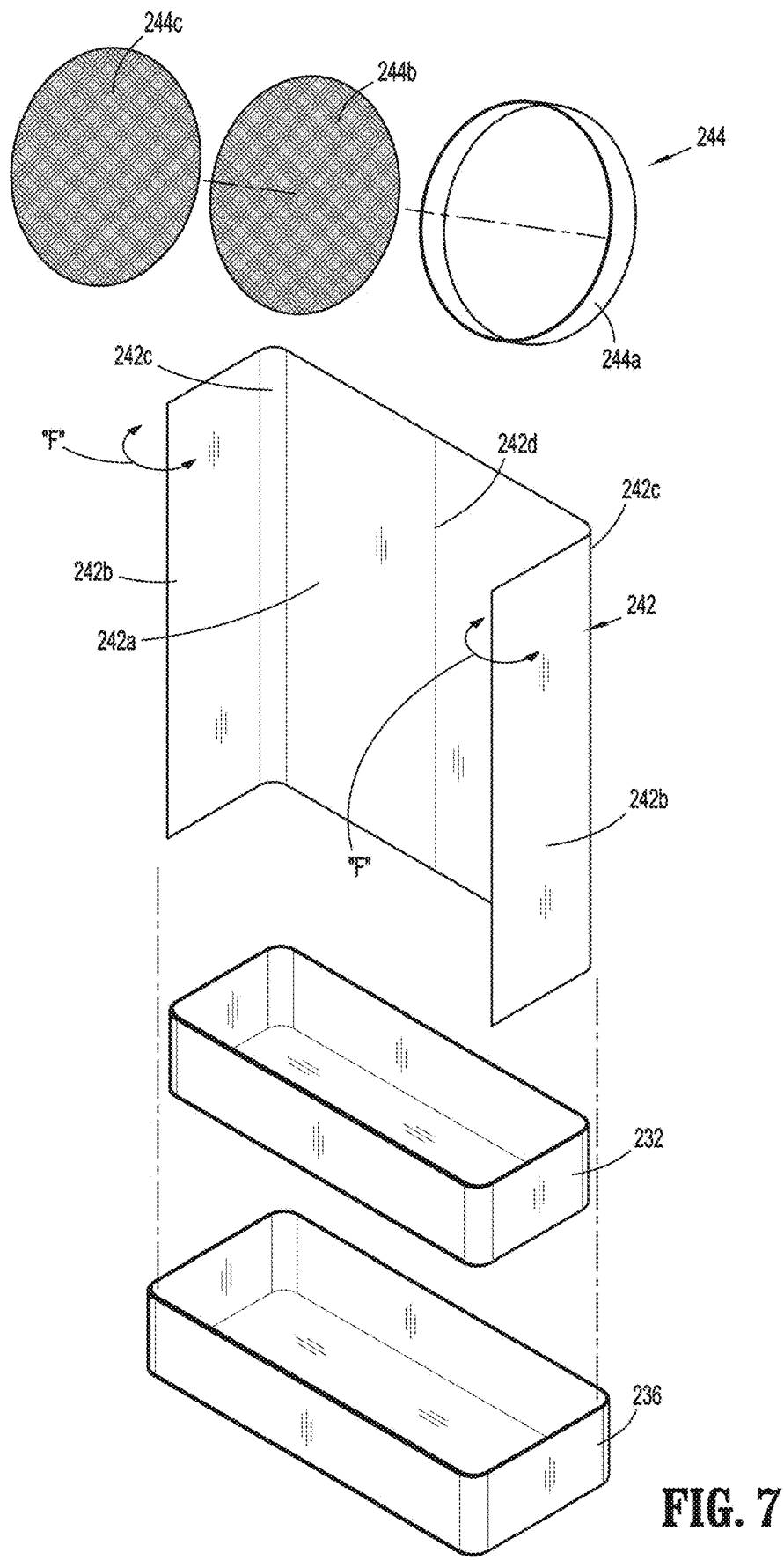
FIG. 7 is a perspective view, with parts separated, of a filter assembly and a container assembly of the wine filtering system of FIG. 6.
Figure 8:
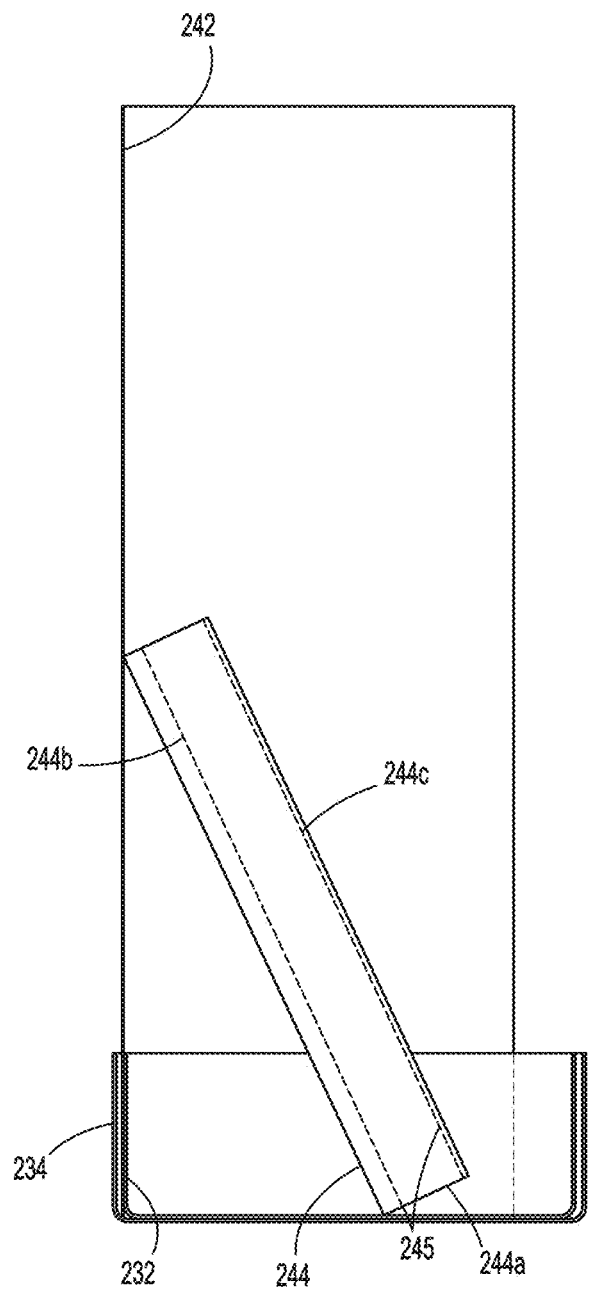
FIG. 8 is a side view of the filter assembly and the container assembly of the wine filtering system of FIG. 6 with the filter assembly shown supported by the container assembly.

Filter assembly 240 of wine filtering system 200 includes a collector 242 and a screen assembly 244. Collector 242 of filter assembly 240 includes a central wall 242a and one or more flaps 242b that are receivable within collector receiving channel 236 of container assembly 230 to support collector 242 between first and second elongated trays 232, 234 in an upright position as shown in FIG. 6. Flaps 242b are separated by central wall 242a by side seams 242c and central wall 242a may include a central seam 242d. Central seam 242d and side seams 242c are configured to enable collector 242 to be manipulated into position and to enable collector 242 to be folded for ease of storage. Flaps 242d are configured to fold about side seams 242c relative to central wall 242a, as indicated by arrows "F." Collector 242 can also be folded about central seam 242d. Similar to collector 42, collector 242 may be formed from any suitable material such a natural or synthetic material like plastic.

The screen assembly 244 of the filter assembly 240 includes a screen mount 244a secured to first and second mesh screens 244b, 244c via stitching 245. Although screen mount 44a and the first and second mesh screens 44b, 44c shown as having a circular configuration, any suitable shape or configuration may be provided. First and second mesh screens 244b and 244c are similar to mesh screen 44b and are configured to separate at least portions of the alcohol component of the spray "S" from the juice component of the spray "S" to define a filtered wine "FW" and a filtered alcohol when the spray "S" collides with the first and/or second mesh screens 244b, 244c. First and second mesh screens 244b, 244c define a plurality of apertures 246 therethrough that enable the filtered wine "FW" to pass through the first and second mesh screens 244b, 244c for collection by container assembly 230.

Persons skilled in the art will understand that the devices and methods specifically described herein and illustrated in the accompanying drawings are non-limiting exemplary aspects of the disclosure. It is envisioned that the elements and features illustrated or described in connection with one exemplary aspect of the disclosure may be combined with the elements and features of another without departing from the scope of the disclosure. As well, one skilled in the art will appreciate further features and advantages of the disclosure based on the above-described aspects of the disclosure. Accordingly, the disclosure is not to be limited by what has been particularly shown and described, except as indicated by the appended claims.

What is claimed is:
1. A wine filtering system, comprising:
a container assembly;
a collector configured to be supported by the container assembly;
a screen assembly configured to be supported by the collector and within the container assembly, the screen assembly being spaced from the collector such that the collector curves over the screen assembly, the screen assembly including a screen mount having at least one mesh screen secured thereto, the at least one mesh screen configured to separate at least portions of an alcohol component of wine from a juice component of wine sprayed thereagainst to define a filtered wine and a filtered alcohol, and wherein the at least one mesh screen enables the filtered wine to pass through the at least one mesh screen for collection by the collector such that the collector directs the collected filtered wine into the container assembly; and
an atomizer selectively attachable to an opened wine bottle and configured to spray the wine against the at least one mesh screen.
2. A wine filtering system, comprising:
a container assembly;

a collector configured to be supported by the container assembly;

a screen assembly configured to be supported by the collector and within the container assembly, the screen assembly including a screen mount having at least one mesh screen secured thereto, the at least one mesh screen configured to separate at least portions of an alcohol component of wine from a juice component of wine sprayed thereagainst to define a filtered wine and a filtered alcohol, and wherein the at least one mesh screen enables the filtered wine to pass through the at least one mesh screen for collection by the collector such that the collector directs the collected filtered wine into the container assembly, wherein the container assembly includes a first elongated tray and a second elongated tray that is receivable within the first elongated tray, the first and second elongated trays defining a collector receiving channel therebetween, the collector receivable within the collector receiving channel to support the collector in an upright position relative to the first and second trays so that the screen assembly can be supported within the second elongated tray and positioned against the collector at an angle.

3. A wine filtering system, comprising:

an atomizer selectively attachable to an opened wine bottle that stores wine having a juice component and an alcohol component, the atomizer including a spray nozzle operably coupled to an actuator, the actuator being actuatable to dispense the wine from the opened wine bottle and through the spray nozzle as a spray; and a filter assembly including a collector and a screen assembly supported by the collector, the collector spaced from the screen assembly and curving over the screen assembly, the collector having an inner surface, the screen assembly including a screen mount supported by the inner surface of the collector and secured to at least one mesh screen, the at least one mesh screen spaced from the inner surface of the collector, the at least one mesh screen configured to separate at least portions of the alcohol component of the spray from the juice component of the spray to define a filtered wine and a filtered alcohol when the spray collides with the at least one mesh screen, and wherein the at least one mesh screen enables the filtered wine to pass through the at least one mesh screen for collection by the inner surface of the collector, and wherein the open end portion of the collector is configured to enable the collected filtered wine to pass therethrough and out of the filter assembly.

4. The wine filtering system of claim 2, further comprising:

an atomizer configured to be supported upon a storage vessel that stores the wine, the atomizer including a spray nozzle operably coupled to an actuator, the actuator being actuatable to dispense the wine from the storage vessel and through the spray nozzle as a spray.

5. The wine filtering system of claim 3, further comprising a container configured to removably support the filter assembly.

6. The wine filtering system of claim 5, wherein the container defines a storage cavity that is disposed in fluid communication with the collector when the filter assembly is disposed in the container, the container configured to receive and store the filtered wine passed through the filter assembly.

7. The wine filtering system of claim 2, wherein the at least one mesh screen includes metallic material.

8. The wine filtering system of claim 2, wherein the at least one mesh screen defines a plurality of apertures therethrough.

9. The wine filtering system of claim 2, wherein the collector includes a natural material, a synthetic material, or combinations thereof.

10. The wine filtering system of claim 9, wherein the collector includes polymeric material.

11. The wine filtering system of claim 5, wherein the container includes a spout to enable the filtered wine to be poured from the container into a drinking glass.

12. The wine filtering system of claim 4, wherein a plurality of apertures of the at least one mesh screen is configured to cause air molecules within the spray to reflect off the at least one mesh screen and release an aroma into the atmosphere when the spray collides with the at least one mesh screen.

13. The wine filtering system of claim 12, wherein the at least one mesh screen includes at least 4 apertures per square millimeter.

14. The wine filtering system of claim 2, wherein the at least one mesh screen includes two mesh screens that are secured to the screen mount via stitching.

15. The wine filtering system of claim 3, wherein the at least one mesh screen includes metallic material.

16. The wine filtering system of claim 3, wherein the at least one mesh screen defines a plurality of apertures therethrough.

17. The wine filtering system of claim 3, wherein the collector includes a natural material, a synthetic material, or combinations thereof.

18. The wine filtering system of claim 17, wherein the collector includes polymeric material.

19. The wine filtering system of claim 3, wherein a plurality of apertures of the at least one mesh screen is configured to cause air molecules within the spray to reflect off the at least one mesh screen and release an aroma into the atmosphere when the spray collides with the at least one mesh screen.

20. The wine filtering system of claim 19, wherein the at least one mesh screen includes at least 4 apertures per square millimeter.

* * * * *